Sept. 16, 1941.　　　　C. J. PATTERSON　　　　2,256,003
APPARATUS FOR TREATING DOUGH
Filed July 31, 1939　　　5 Sheets-Sheet 1

INVENTOR
Curtis J. Patterson.
BY Arthur L. Brown
ATTORNEY

Fig. 4.

Patented Sept. 16, 1941

2,256,003

UNITED STATES PATENT OFFICE 2,256,003

APPARATUS FOR TREATING DOUGH

Curtis J. Patterson, Mission Hills, Kans.

Application July 31, 1939, Serial No. 287,428

9 Claims. (Cl. 107—4)

This invention relates to an apparatus for treating dough, and more particularly for practicing a continuous process of proofing dough and transferring it to an oven for baking without exposing the proofed dough during such transfer to such deleterious influences as air exterior to apparatus by which the method is practiced, or handling steps by operators intermediate the proofing and baking states of the dough.

It has heretofore been the practice to prepare dough for rolls, loaves of bread and the like, according to suitable formulas, and after preliminary raising to work the prepared dough as by dividing, twisting and other operations, the worked dough then being placed in suitable receptacles and deposited in a proof-box under such temperature and relative humidity as to cause further fermentation of yeast normally present in the dough, the fermented yeast causing the dough to rise to full or desired size or volume in relation to weight.

It has heretofore been customary to transfer dough from the proof-box to an oven, which, in larger bakeries, is usually of plate conveyor type, necessitating introduction of the dough to the oven in individual trays.

According to common practice a batch of dough is uniformly treated in the proof-box, and the treatment of the whole batch completed at the same time. This necessitates holding the batch until all the trays of dough have been deposited on the oven conveyor, with the result that dough may be exposed to air containing dust or an improper amount of moisture.

During transfer of the dough from the proof-box to the oven, operators are apt to jar the dough in such transfer operations and cause the dough to fall, all of which results in a finished product lacking desired uniformity in either grain structure or volume per unit of weight.

The principal objects of the present invention are, therefore, to provide an efficient, convenient and relatively economical method and apparatus for treating dough in such a manner as to obtain a uniform finished bakery product and to overcome difficulties and disadvantages in present baking practices.

Other important objects of the present invention are to combine a proof-box with an oven and effect a continuous treatment of dough within the combined structural unit; to provide for conditioning the interior of a combined structure of this character in such a manner that suitable proof-box and oven conditions respectively prevail in the same unit during the continuous treating operations on the dough applied to the structure; to provide for dividing the proof-box and oven portions of the combined structure and yet allow the dough to pass unimpeded from one portion or section of the structure to the other; to provide for circulating conditioned air about the dough treated in the structure in such a manner that treatment may be uniform on all portions of the dough; to provide an air curtain or curtains for dividing the proof-box and oven from each other and/or from exterior atmospheric conditions; to provide the proof-box and/or oven with conveyors having grid plates for allowing circulation of conditioned air throughout the unit and dough treating chambers thereof; to roduce the moving weight in the chambers to permit lighter construction of the entire assembly; and to provide improved steps and arrangements of them, together with improved elements and arrangements of them, in my improved method and apparatus for treating dough.

In accomplishing these and other objects of the present invention, I have provided improved steps in the method which may be carried out in an apparatus, the details of structure of the preferred form of which are shown in the accompanying drawings, wherein:

Fig. 1—A is a plan view of the oven section, a portion of which is shown in plan in Fig. 1.

Fig. 2—A is a side elevation, partly in section, of the oven section illustrated in Fig. 1—A.

Figure 1:
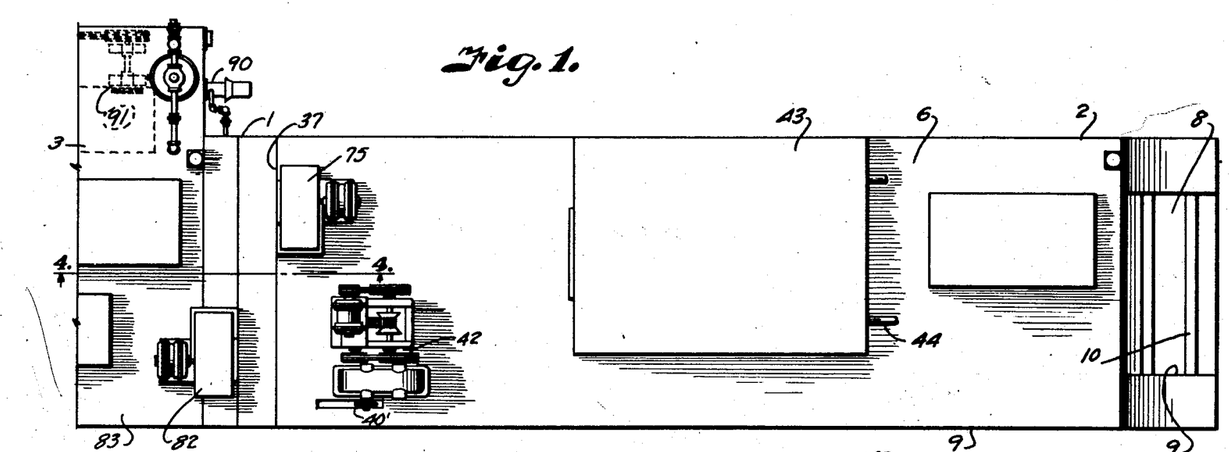
Fig. 1 is a plan view of a proof-box section and a portion of an oven section for treating dough in accordance with this invention.
Figure 2:
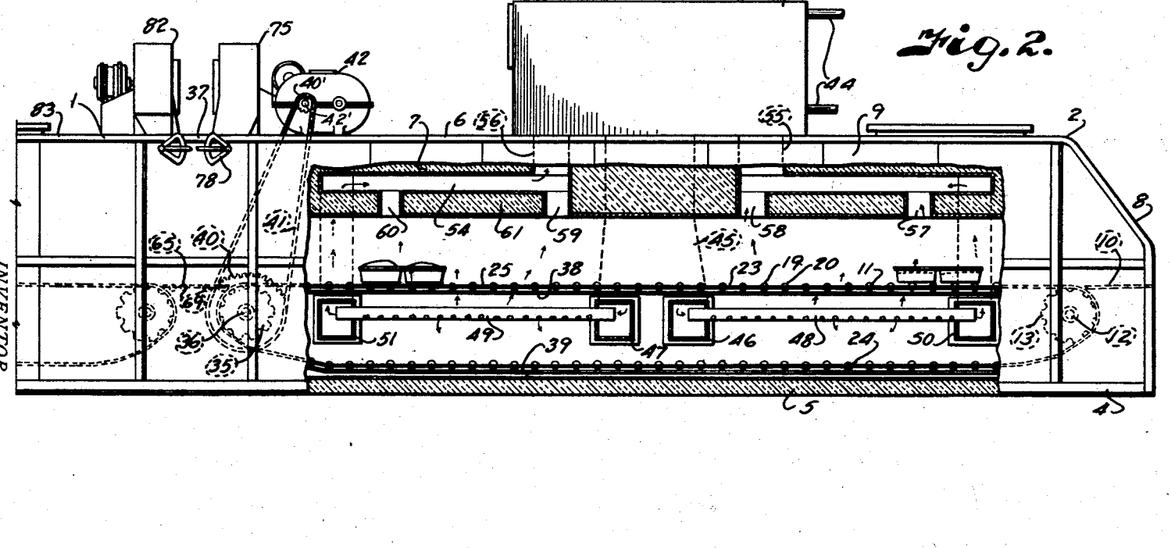
Fig. 2 is a side elevational view, partly in section, of the proof-box section and the portion of the oven section illustrated in Fig. 1.

Referring more in detail to the drawings:

1, Fig. 1, generally designates a combined unit for performing the steps of my improved method of treating dough, the unit consisting of a proof-box section 2, Figs. 1 and 2, and an oven section 3, Figs. 1, 1—A and Figs. 2, 2—A.

The proof-box section 2 preferably consists of suitable structural members forming a base 4 provided with suitable insulation 5, a top 6 provided with suitable insulation 7, and a feeder end 8, suitably insulated side walls 9 being interconnected with the base and top 4 and 6 to form an enclosed housing. The feeder end 8 of the housing is provided with an opening for introducing dough to the interior of the housing, a shelf 10 being provided at the feeder end for initially receiving and supporting the dough within the housing.

It is intended that dough be treated in the proof-box under related time, temperature and humidity conditions of air in the proof-box, and that once dough is introduced to the proof-box, it may be carried through the same for automatic treatment. To this end, a conveyor generally designated 11, Fig. 2, is provided, which is preferably of endless type. A shaft 12 is suitably mounted in bearings supported by the side walls 9 of the housing and spaced sprocket wheels 13 are fixed to the shaft. The teeth of the sprocket wheels are arranged for meshing in spaces 14, Fig. 6, between links 15 and 16 pivotally mounted on pins 17 and 18 which rotatably support rollers 19 and 20 between the links 15—16 and the links 21—22 of an adjacent link forming group of elements, a series of which forms an endless chain having an upper run 23 and a lower run 24, Fig. 2. It is contemplated that a pair of chains be provided which may be spaced by the wheels 13 a suitable distance from each other for supporting the opposite ends of each of a series of plates 25.

Figure 6:
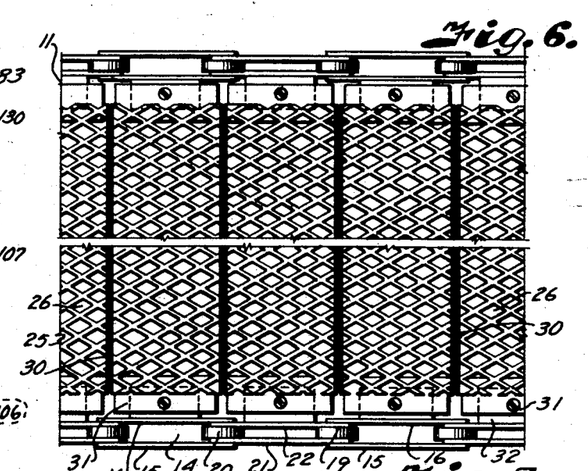
Fig. 6 is a detail plan view of a series of my improved grid conveyor sections or trays.
Figures 7, 8:
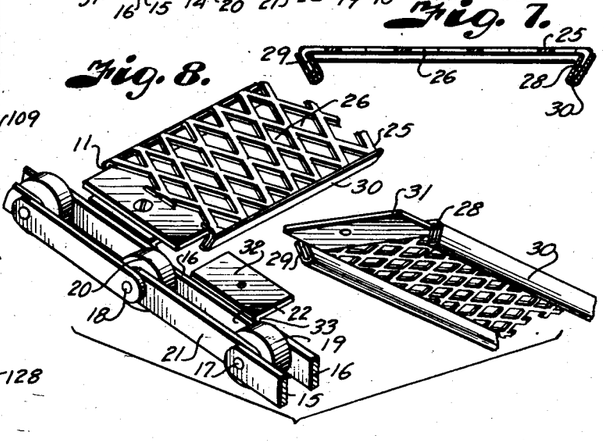
Fig. 7 is a vertical transverse cross-section through one of my improved grid conveyor trays.
Fig. 8 is a detail perspective view of a pair of conveyor sections, particularly illustrating the relation and manner of application of the grids to the conveyor proper.

The plates 25 are preferably of grid type, each having a dough supporting body member provided with apertures 26 preferably of diamond or triangular shape, depending upon the position of the apertures relative to the plates, as shown in Figs. 6 to 8. The side edges of the plates 25 are preferably turned downwardly and inwardly to form flanges 28 and 29 which strengthen the plates, the flanges preferably being provided with sheaths 30 for covering the edges of the plate flanges and reinforcing the same.

The ends of the grid plates are preferably provided with transverse plates 31, which may be welded to the grid plates, the plates 31 preferably being provided with apertures alignable with inwardly directed plate supporting flanges 32 on angle clips 33; fastening devices of suitable character being provided to interconnect the same. The other flanges of such angle clips are suitably secured, as by welding, to oppositely disposed corresponding inner links 16 and 22 of the spaced conveyor chains for forming an endless conveyor suitable for supporting dough as it is deposited thereon and for allowing conditioned air to pass through the conveyor to all parts of the box housing in such a manner as to uniformly treat the dough on the conveyor plates.

The ends of the conveyor chains opposite those supported by the sprocket wheels 13 are mounted on similar sprocket wheels 35 which are suitably fixed on a shaft 36 adjacent the discharge end 37, Fig. 2, of the proof-box.

As a matter of practice, it is preferable to provide tracks or supports 38 and 39 for the conveyor chain rollers 19 and 20 to prevent the conveyor from sagging, particularly the top run thereof, while supporting dough thereon, the tracks for the rollers further facilitating efficient operation of the conveyor.

The conveyor is preferably actuated through a primary sprocket wheel 40 on the shaft 36 and a chain belt 41 run over a sprocket wheel 40' on the drive shaft 42' of a motor 42 of variable speed type which may be suitably mounted on the top wall 6 of the proof-box housing, as shown in Figs. 1 and 2; suitable provision being made in the wall 6 of the housing for passing the chain belt 41 therethrough. The speed of the motor 42 may be set to move the conveyor at a speed to carry the dough through the proof-box housing in a predetermined length of time, depending upon the formula of the dough and the results desired.

In order to treat the dough while in transit through the proof-box, air in the proof-box is maintained at a temperature and relative humidity best suited for causing substantially a full rise in the dough. As a matter of practice, it has been found preferable to maintain the temperature of air in the proof box at a temperature of approximately 90° Fahrenheit, and to maintain an approximately 95% relative humidity of the air. The desired temperature and relative humidity of the air may be maintained by a conventional air conditioning unit 43, which may be mounted on the top wall 6 of the proof-box housing, as shown in Figs. 1 and 2.

Customary connections indicated by shaft 44 are provided for operating the air conditioning unit 43, and ducts connect the air conditioning unit with the interior of the housing, including a supply duct 45 arranged substantially centrally in one of the side walls 9 of the housing and communicating with a pair of ducts 46 and 47 extending transversely of the housing within the interior thereof at a point between the upper and lower runs of the conveyor chains, as clearly shown in Fig. 2. Each of the ducts 46 and 47 has oppositely arranged outlet perforate pipes 48 and 49 for discharging conditioned air into the interior of the housing. The ends of the pipes 48 and 49 opposite the ducts 46 and 47 are supported in discharge ducts 50 and 51, through which excess conditioned air or used air is transferred, as shown by the arrows in Fig. 2, to a horizontally arranged top duct 54 leading, by means of legs 55 and 56, back to the air conditioning unit for reconditioning.

Conditioned air emitted from the perforations in the pipes 48 and 49, proportionate to its pressure and volume, rises through the apertures in the trays of the conveyor to the portions of the interior of the proof-box housing surrounding the dough on the conveyor, and subsequently through ducts 57, 58, 59 and 60 in an insulated partition 61 into the horizontal duct 54 for passage back to the air conditioning unit.

With the structure thus far described, it is apparent that dough conducted through the proof-box housing by the conveyor may be treated by air delivered from the conditioning unit while in transit to effect a uniform and full rise of the dough.

Figure 4:
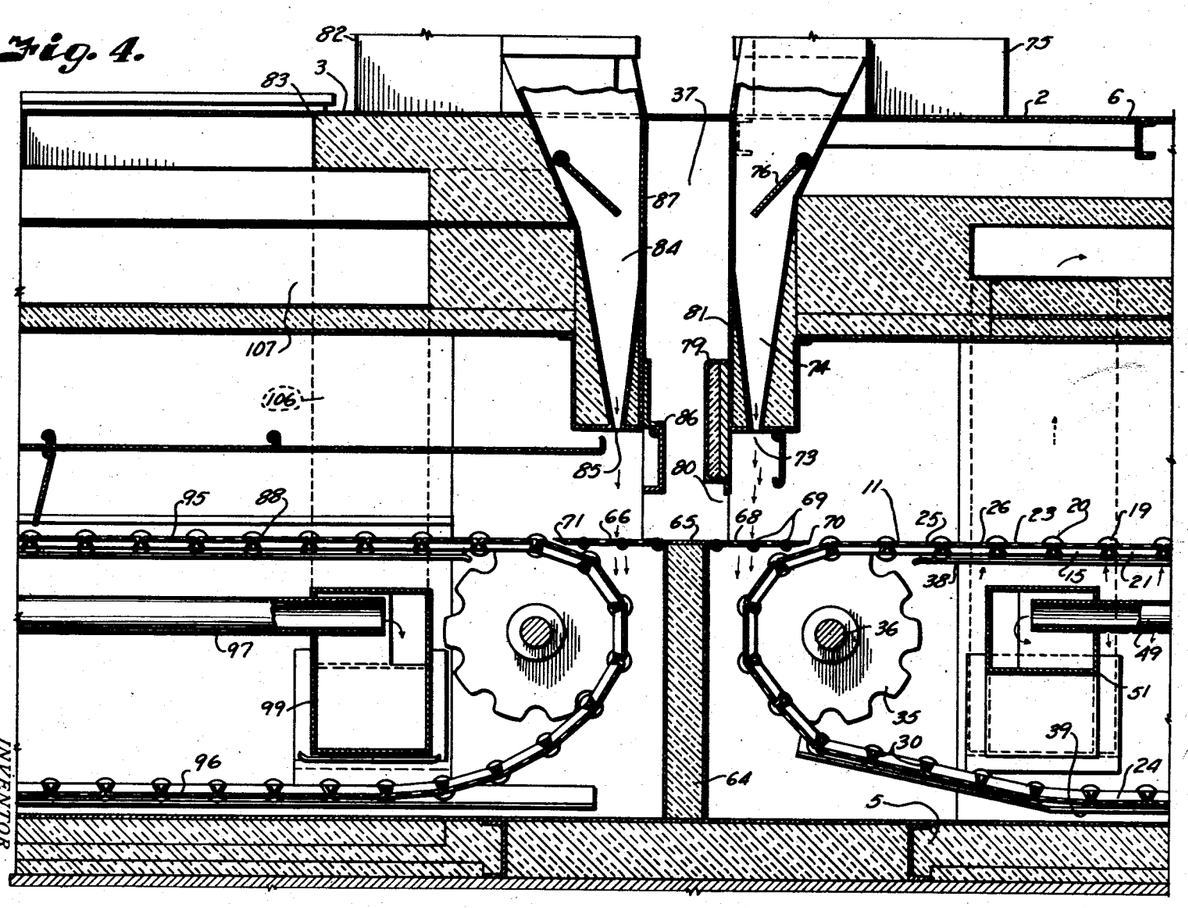
Fig. 4 is a detail vertical cross-section through the juncture of the proof-box and oven sections of the unit substantially on the line 4—4, Fig. 1, particularly illustrating the manner of transferring dough from one section to the other while maintaining proper atmospheric conditions in the respective sections.

From the proof-box 2, the pans of dough are passed into the oven section 3 above an insulated partition 64, Fig. 4, mounted transversely of the proof-box housing adjacent the delivery end of the conveyor 11. The transfer of the pans of dough from the proof-box to the oven may be accomplished by gravity or mechanical means. Therefore, the transfer means now described is merely one form of apparatus for accomplishing this result.

Mounted on the partition 64 is a track section 65, preferably consisting of plate sections 66 provided with apertures 68 to allow passage of conditioned air therethrough, and with rollers 69 for facilitating travel of the pans of dough across the track under propelling force of succeeding lots of dough. The ends of the track section are preferably provided with knife edges 70 and 71, the knife edge 70 effectively removing the pans of dough from the conveyor plates approaching the same for transfer from the conveyor plates to the track section 65, and the knife edge 71 allowing transfer of the pans of dough from the track section 65 to an oven conveyor 88, later more specifically described, with a minimum amount of required clearance between the track section and conveyor.

The conditions of air for treating the dough in the proof-box and oven are necessarily different, and in order to effectively maintain the proper conditions in both sections during a continuous treatment of dough, I have provided for insulating the sections from each other while allowing the dough to progress from one section to the other. This insulation is in the form of an air curtain, preferably passing downwardly as shown by the arrows in Fig. 4 from a slit 73 in a duct 74 communicating with an air blower 75, Figs. 1 and 2, mounted exteriorly of the proof-box housing on the top wall 6 thereof. The duct 74 and the slit 73 in the bottom thereof are preferably arranged above the track section 65 and extend across the width of the track and the interior of the proof-box housing. The continuous stream of air emitted from the duct under the influence of the blower 75 thus forms a layer or blanket of insulating air in the nature of a curtain, which prevents heat transfer beyond such curtain or material alteration in the relative humidity of the air in the proof-box. As a matter of practice, a swinging control baffle and a damper 76 may be provided for the slit 73 and duct 74 respectively which may be suitably controlled as by an exterior manual control element 78, Fig. 2.

Also as a matter of practice, a vertically sliding door 79, Fig. 4, of suitable construction may be provided for adjusting the size of opening 80 between the partition 64 and duct supporting column 81 which, with the air curtain, separate the proof-box from the oven section.

An air curtain, substantially a duplicate of that just described in connection with the proof-box, is preferably provided at the feeder end of the oven section, which air curtain may be generated by a blower 82 on the insulated top wall 83, Fig. 4, of the oven section, the blower communicating through a damper controlled duct 84 and slit 85 at the bottom thereof with the interior of the oven section at the feeder end thereof. A suitable swinging and/or vertically sliding door 86 is preferably mounted on the duct column 87 and extends transversely of the feeder end of the oven for additionally partitioning the proof-box relative to the oven section if and when desired.

The oven conveyor 88 to which the dough is transferred from the track 65 is substantially similar in construction to the coveyor 11 described in connection with the proof-box. The time required for treating the dough in the proof-box is usually about twice that required for treating the dough in the oven, but may vary, depending upon the formula of the dough and the results desired.

It will be understood that the oven section 3 of the dough treating unit is for baking the dough, and it is therefore necessary to supply heat to the interior of the oven section. This is accomplished by a burner 90, Fig. 1, provided with an air blower 91 and a control 92, Fig. 1—A, for mixing air and fuel, such as gas, and subsequently passing the heated products of combustion into feeder ducts 93 substantially as in conventional practice.

The ducts 93 are preferably arranged in series transversely of the interior of the oven section and between the runs 95 and 96 of the conveyor 88. Pipes 97 and 98, Fig. 2—A, lead from the feeder ducts 93 within the oven section to exhaust duct headers 99 for heating the oven to baking temperatures.

It is desirable in baking operations to maintain the air in the oven in moist condition in order that the crust formed on the dough may not dry out and become brittle. In accomplishing this object, I provide the interior of the oven housing with controlled quantities of steam which may be generated and/or collected in a steam tank 100, and transferred by valved pipe connections 101 to steam ducts 102 suitably supported, for example, on the side walls 103 of the oven section. From the ducts 102, branches 104 extend upwardly and are provided with nozzles 105 suitable for effecting dissemination of steam throughout the interior of the oven section housing and preferably upon the top surface of dough passing through the housing on the conveyor.

Figure 3:
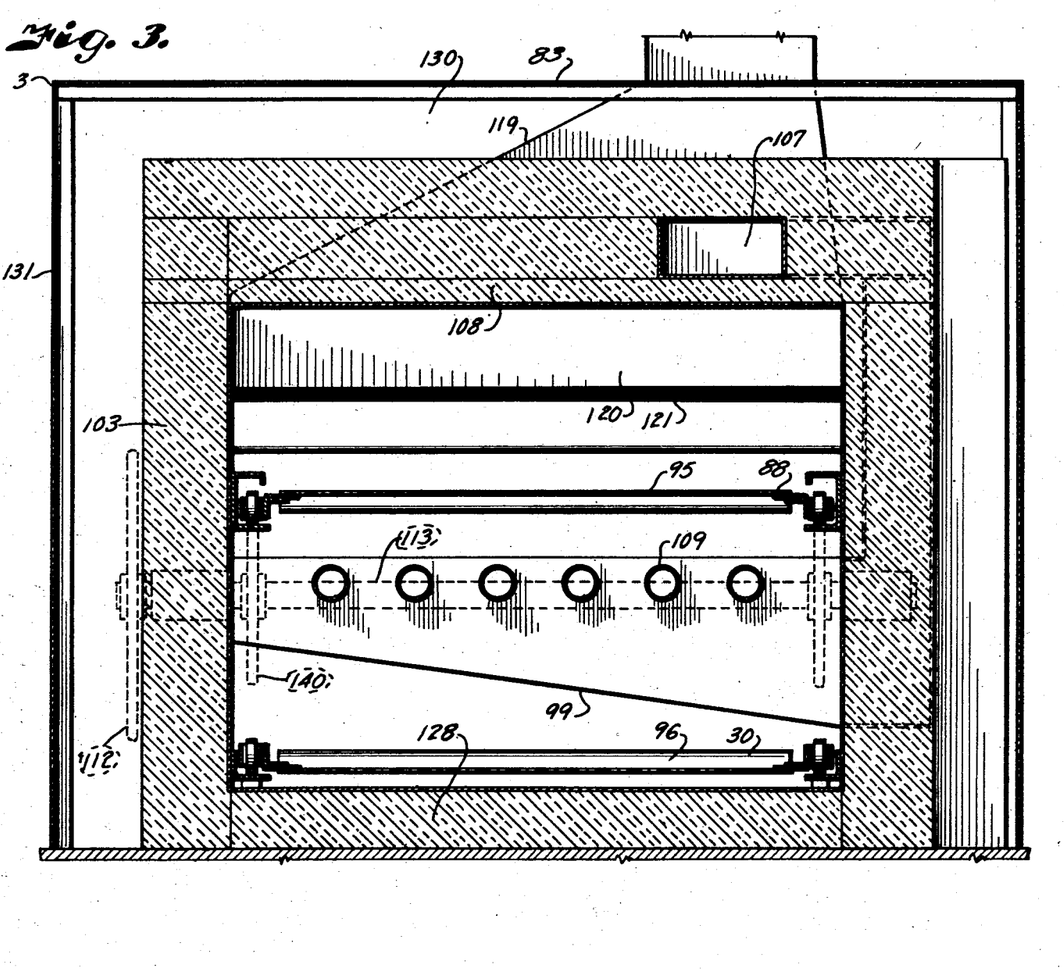
Fig. 3 is a vertical cross-section through the oven section of my improved dough treating apparatus substantially on the line 3—3, Fig. 5, particularly illustrating the relation of heat supplying elements to the exhaust elements therefor.

The headers 99 are utilized for collecting excess or used air in the oven section and communicate both with the interior of the oven section housing and with ducts 106, as shown in dotted lines in Fig. 3, which pass upwardly in the side walls of the oven section housing to a longitudinally arranged discharge duct 107 in the insulated top wall 108 on the oven section for suitable disposition.

Due to the length of the oven section of the dough treating unit, auxiliary burners are required for the several divisions or portions of the oven section, as indicated, for example, by the pipes 97, 98 and 109, Fig. 2—A, the burners being supplied from gas reservoirs 110 which are supplied by gas blowers 111, as shown in Fig. 2—A.

After transfer of dough treated in the proof-box to the track section 65 between the proof-box and oven sections, continuation of actuation of the proof-box conveyor 11 forces the dough across the track onto the conveyor 88 in the oven section. The oven section conveyor is actuated by a sprocket 112, Fig. 2—A, fixed to the shaft 113, the sprocket being operatively connected through a chain belt or the like 114 with a sprocket 115 on the drive shaft of a motor 116 similar to the motor 42 for the proof-box conveyor. Suitable provision may be made for passing the belt 114 through the top wall of the oven section. Actuation of the oven section conveyor moves the dough transferred thereto toward the discharge end 118, Fig. 5, of the oven section.

The oven section under normal operating conditions is quite hot, and in order to allow the dough to be discharged from the conveyor while retaining the proper heat in the oven and protecting an operator receiving the dough as it is discharged from the oven, I provide insulation preferably in the form of an air curtain similar to those described in connection with that part of the unit separating the proof-box and oven sections.

In this instance, a duct 119 is provided at the discharge end of the oven section having a downwardly and inwardly directed nozzle 120 provided with a slot 121 arranged transversely of the oven section and spaced above the path of travel of the dough on the conveyor. The duct 119 is fed with air from a blower 122, and is controlled by a damper 123 which may be actuated by a control 124, Fig. 2—A, on the exterior of the oven section. A swinging baffle 125, Fig. 5, is also provided which may be employed for aiding in effectively controlling the air curtain formed by emission of air from the duct through the slot in the nozzle thereof.

Figure 5:
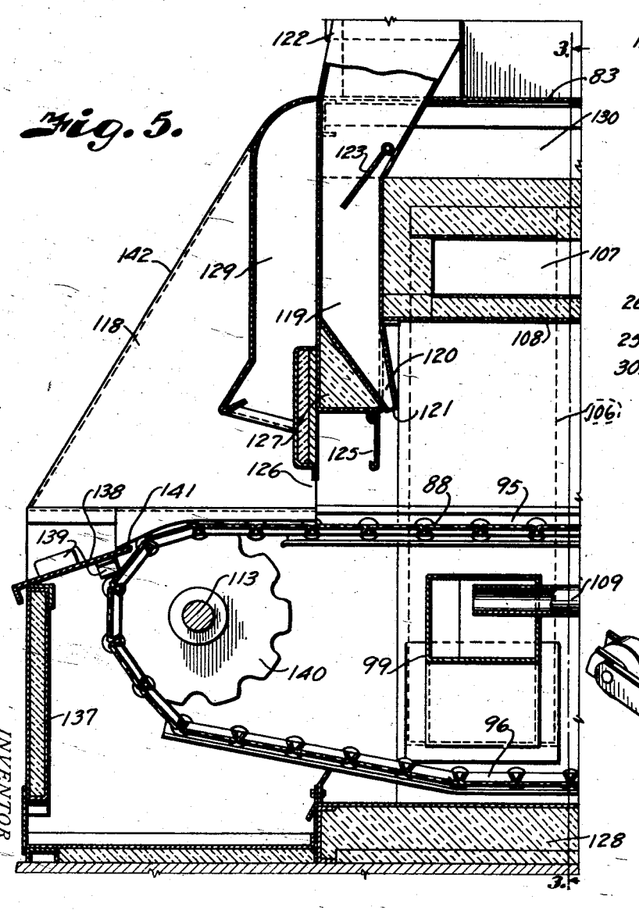
Fig. 5 is a central vertical cross-section through the discharge end of the oven section, substantially on the line 5—5, Fig. 1—A, and particularly illustrating the relation of an air curtain forming device to such discharge end of the oven section for maintaining proper conditions in the oven.

A certain amount of vapor will escape from the interior of the oven section through the outlet 126 between the insulated top wall 127 of the oven section and the insulated bottom wall 128 thereof, Fig. 5, and I therefore find it preferable to provide a hood 129 in the discharge end of the oven section adjacent the outlet 126 and spaced thereabove, which hood may communicate with the space 130 inside the shell 131, Fig. 3. Exhaust devices 132, Fig. 1—A, preferably power driven by motors 133, are provided for circulation of the air in the oven.

It is conventional practice to inject air into the oven section by air injecting apparatus 135 and 136, Fig. 1—A, which communicate with and supply the oven with air through suitable ducts.

The discharge end of the oven section is also provided with an insulated end wall 137, Fig. 5, on which is mounted one end of a shelf 138, the other end of which is supported as by angle brackets 139 suitably mounted on the side walls of the oven section at a point adjacent and tangential to the path of the oven section conveyor as it rounds the supporting toothed wheels 140 at the discharge end of the conveyor. The shelf 138 is provided with a relatively thin edge 141 adjacent the conveyor for effectively removing the baked loaves from the trays of the conveyor.

The discharge end of the oven section may further be finished with rearwardly and upwardly directed structural members 142 of such a character as to facilitate reception and removal of the dough and loaves to and from the oven section by an operator stationed at the discharge end of the unit.

The steps in the method and the operation of the apparatus for treating dough as herein disclosed are as follows:

Dough which has been treated according to a desired formula are shaped in the desired manner and placed in pans which are applied to the shelf 10, Fig. 2, at the feeder end of the proof-box and the pans of dough are then successively fed onto the plates 25 of the proof-box conveyor, as the conveyor is moved under control of the motor 42.

The air conditioning unit on the exterior of the proof-box is actuated for causing conditioned air to issue from the perforations in the pipes 48 and 49 between the runs of the conveyor, the conditioned air circulating throughout the proof-box by passing through the apertures in the conveyor plates and being subsequently discharged from the proof-box through the vertical ducts in the top wall thereof to the horizontal duct 54 therein, and finally back to the air conditioning unit for reconditioning or other suitable disposition of the used conditioned air. The length of time for passage of the dough through the proof-box may be predetermined and the motor 42 adjusted in accordance with such predetermined interval in such a manner as to deliver the dough to the discharge end of the proof-box conveyor as soon as the dough has fully risen.

Continuation of actuation of the motor 42 causes the conveyor to push the dough onto the track section 65, Fig. 4, but the air curtain formed by the action of the slot 73 on air forced through the duct 74 by the blower therefor insulates the interior of the proof-box relative to the remainder of the dough treating unit and thus effectively maintains the proper air conditions in the proof box, yet allows the dough to be transferred to the track section without impeding progress of the dough through the unit.

From the track section 65, the dough passes onto the feeder end of the oven section conveyor 88 while passing through another air curtain formed by action of the slot 85 in the duct 84 on air applied to the duct by the blower 82 on top of the oven section, this second air curtain aiding the proof-box air curtain in separating the sections of the unit and maintaining their proper conditions with respect to temperature and relative humidity.

Heat in the oven section is applied by burners such as 90, Fig. 1, which are controlled and provided with air by the blower 91 and control 92 therefor, products of combustion from the burner or burners passing through ducts 93, Fig. 1—A, in such a manner as to heat the pipes 97, 98 and 109, Fig. 2—A, so that heat may radiate from the pipes and bring the interior of the oven to desired baking temperature. Steam is also applied to the dough, while being baked, through the jets 105 which are supplied by the steam tank 100, Fig. 2—A.

Since the oven conveyor is constructed similarly to the proof box conveyor, heat radiating from the pipes and steam issuing from the jets may act on the air in the oven to cause its circulation through the apertures in the conveyor trays to the end that all surfaces of the dough may be uniformly treated and a finished product of good grain and proper volume per unit of weight may result from the treatment of the dough.

As the dough progresses along the oven under control of the conveyor, which may be run at a desired speed in accordance with the predetermined baking interval by means of the variable speed motor 116, it ultimately reaches the discharge end of the oven and passes through the air curtain formed by blowing air through the duct 119, Fig. 5, for issuance through the slot 121 directly across the path of travel of the dough on the conveyor, the air curtain insulating the interior of the oven from the exterior thereof and thus maintaining proper conditions within the oven best suited for baking the dough.

The dough, upon being baked, is delivered to the shelf 138 at the discharge end of the oven simply by continuation of movement of the oven conveyor, and an operator stationed at the discharge end of the oven may easily remove the baked dough from the shelf and suitably dispose of it.

It is apparent, therefore, that I have provided a method of treating dough by which the dough may be proofed and baked in a continuous process, and that I have provided a suitable illustrative apparatus by means of which the method may be conveniently, efficiently and economically carried out.

What I claim and desire to secure by Letters Patent is:

1. In an apparatus for treating dough, means forming a plurality of respectively confined chambers, means for effecting continuous travel of dough through said chambers collectively, means adapting the interior of certain of said chambers for respectively proofing and baking said dough, and means for forming an air curtain between said chambers to delimit proofing and baking action on the dough in said chambers respectively during travel of the dough therethrough.

2. In an apparatus for treating dough, a housing having an inlet and an outlet, means adapting the interior of said housing for conditioning dough applied to said housing through said inlet, means for effecting travel of the dough through the housing while being conditioned from the inlet to the outlet thereof, a second housing having an inlet arranged adjacent the outlet of said first named housing and having an outlet, means transferring dough treated in the first named housing to said second housing in response to travel of said dough on said travel effecting means, and means arranged adjacent the outlet and inlet of said first and second named housings respectively forming an air curtain for insulating and dividing the interior of said housings relative to each other.

3. In an apparatus for treating dough, a housing having an inlet and an outlet, means adapting the interior of said housing for conditioning dough applied to said housing through said inlet, means for effecting travel of the dough through the housing while being conditioned from the inlet to the outlet thereof, a second housing having an inlet arranged adjacent the outlet of said first named housing and having an outlet, means transferring dough treated in the first named housing to said second housing in response to travel of said dough on said travel effecting means, means arranged adjacent the outlet and inlet of said first and second named housings respectively forming an air curtain for insulating and dividing the interior of said housings relative to each other, means for effecting travel of the dough through said second housing from the inlet to the outlet thereof, and means in the second housing adapting the interior thereof for conditioning said dough differently from the conditioning of the dough in the first named housing during travel of the dough therethrough.

4. In an apparatus for treating dough, a housing having an inlet and an outlet, means adapting the interior of said housing for conditioning dough applied to said housing through said inlet, means for effecting travel of the dough through the housing while being conditioned from the inlet to the outlet thereof, a second housing having an inlet arranged adjacent the outlet of said first named housing and having an outlet, means transferring dough treated in the first named housing to said second housing in response to travel of said dough on said travel effecting means, means arranged adjacent the outlet and inlet of said first and second named housings respectively forming an air curtain for insulating and dividing the interior of said housings relative to each other, means for effecting travel of the dough through said second housing from the inlet to the outlet thereof, means in the second housing adapting the interior thereof for conditioning said dough differently from the conditioning of the dough in the first named housing during travel of the dough therethrough, and means forming an air curtain at the discharge end of the second housing to insulate the interior thereof relative to outside atmosphere.

5. In an apparatus for treating dough, a housing having an inlet and an outlet, means adapting the interior of said housing for conditioning dough applied to said housing through said inlet, means for effecting travel of the dough through the housing while being conditioned from the inlet to the outlet thereof, a second housing having an inlet arranged adjacent the outlet of said first named housing and having an outlet, means transferring dough treated in the first named housing to said second housing in response to travel of said dough on said travel effecting means, and means arranged adjacent the outlet of the first named housing and the inlet of the second named housing forming a pair of spaced air curtains for insulating and dividing the interior of said housings relative to each other.

6. In an apparatus of the character described, the combination of means for treating dough in which the dough is passed continuously through a plurality of respectively confined chambers respectively adapted for proofing and baking said dough, and means for forming at least one air curtain between said chambers to delimit proofing and baking action on the dough in said chambers respectively during travel of said dough therethrough.

7. In an apparatus for treating dough, a housing having an inlet and an outlet, means adapting the interior of said housing for conditioning dough applied to said housing through said inlet, means for effecting travel of the dough through the housing while being conditioned from the inlet to the outlet thereof, a second housing having an inlet arranged adjacent the outlet of said first named housing and having an outlet, means transferring dough treated in the first named housing to said second housing in response to travel of said dough on said travel effecting means, and means for forming an air curtain at the discharge end of the second named housing to insulate the interior thereof relative to outside atmosphere.

8. In an apparatus for treating dough, a housing having an inlet and an outlet, means adapting the interior of said housing for conditioning dough applied to said housing through said inlet, means for effecting travel of the dough through the housing while being conditioned from the inlet to the outlet thereof, a second housing having an inlet arranged adjacent the outlet of said first named housing and having an outlet, means transferring dough treated in the first named housing to said second housing in response to travel of said dough on said travel effecting means, and means for forming an air curtain in insulating relation to a portion of the interior of at least one of the housings.

9. In an apparatus for treating dough, a housing having an inlet and an outlet, means adapting the interior of said housing for conditioning dough applied to said housing through said inlet, means for effecting travel of the dough through the housing while being conditioned from the inlet to the outlet thereof, and means forming at least one air curtain arranged in insulating relation to the interior of said housing at at least one of the inlet and outlet of the housing.

CURTIS J. PATTERSON.